United States Patent [19]

Hall

[11] 4,130,435
[45] Dec. 19, 1978

[54] PROCESS FOR PREPARING A BALL-POINT PEN INK

[75] Inventor: Ira L. Hall, Penns Grove, N.J.

[73] Assignee: E. I. Du Pont de Nemours and Company, Wilmington, Del.

[21] Appl. No.: 614,687

[22] Filed: Sep. 18, 1975

[51] Int. Cl.$^2$ ............................................. C09D 11/18
[52] U.S. Cl. ................................. 106/22; 260/33.4 R; 260/33.4 P; 260/34.2
[58] Field of Search ................................ 106/22, 262; 260/33.4 P, 33.4 R

[56] References Cited

U.S. PATENT DOCUMENTS

| | | | |
|---|---|---|---|
| 1,674,128 | 6/1928 | Rose | 260/182 |
| 2,053,616 | 9/1936 | Landolt | 8/6 |
| 2,095,077 | 10/1937 | Payne | 260/60 |
| 2,153,740 | 4/1939 | Carleton et al. | 260/314 |
| 2,187,816 | 1/1940 | Hartmann et al. | 260/314 |
| 2,950,285 | 8/1960 | Miller et al. | 260/314.5 |
| 2,950,286 | 8/1960 | Miller et al. | 260/314.5 |
| 3,236,660 | 2/1966 | Drautz et al. | 106/23 |
| 3,597,244 | 8/1971 | Fookson et al. | 106/22 |
| 3,705,045 | 12/1972 | Nadolski | 106/22 |

FOREIGN PATENT DOCUMENTS

| | | | |
|---|---|---|---|
| 1248835 | 8/1967 | Fed. Rep. of Germany. | |
| 1328644 | 4/1963 | France | 106/22 |
| 1460208 | 10/1966 | France | 106/22 |
| 902110 | 7/1962 | United Kingdom | 106/22 |
| 1062321 | 3/1967 | United Kingdom | 106/22 |

OTHER PUBLICATIONS

Johnson, *Canadian Paint and Varnish Magazine*, Dec., 1948.

*Primary Examiner*—Allan Lieberman

[57] ABSTRACT

Process for preparing a stable liquid dye which is useful as a ball-point pen ink, said process comprising admixing and reacting at 20°–80° C. approximately stoichiometric amounts of a water-soluble cationic dye and a water-soluble anionic dye to form a cationic-anionic dye salt, there being present either during or subsequent to the admixing and reacting a two-phase liquid medium comprising an upper aqueous phase and a lower ball-point pen ink solvent phase, in which lower phase the cationic-anionic dye salt dissolves, the ball-point pen ink solvent being substantially insoluble in water, and thereafter separating the aqueous and solvent phases and recovering the solvent phase which provides a stable liquid dye which is useful as a ball-point pen ink.

9 Claims, No Drawings

PROCESS FOR PREPARING A BALL-POINT PEN INK

BACKGROUND OF THE INVENTION

1. Field of the Invention

This invention relates to a process for preparing a ball-point pen ink.

2. Description of the Prior Art

Solutions of cationic-anionic dye salts are useful as ball-point pen inks. Prior art processes for preparing solvent-soluble forms of cationic-anionic dyes include those which are carried out combining one or more anionic dyes in aqueous solution with one or more cationic dyes in aqueous solution, the anionic and cationic dyes being present in approximately stoichiometric amounts. Coprecipitation occurs, yielding an amorphous salt-like combination of the anionic and cationic dye components. The precipitate is isolated and, after drying, is dissolved in a suitable ball-point pen ink solvent, e.g., an alcohol, glycol or glycol ether.

DESCRIPTION OF THE INVENTION

The invention resides in a process for preparing a ball-point pen ink, said process avoiding the dusting and handling problems associated with prior art processes involving isolation and drying of the dye employed in the ball-point pen ink. More specifically, the invention resides in the process wherein approximately stoichiometric amounts of water-soluble cationic dye and a water-soluble anionic dye are admixed and reacted at 20°–80° C., preferably 50°–80° C., to form a cationic-anionic dye salt, there being present either during or subsequent to the admixing and reacting a two-phase liquid medium comprising an upper aqueous phase and a lower ball-point pen ink solvent phase, in which lower phase the cationic-anionic dye salt dissolves, the ball-point pen ink solvent being substantially insoluble in water, and thereafter separating the aqueous phase from the solvent phase containing the cationic-anionic dye salt. The solvent phase which is then recovered provides a stable liquid dye which is useful as a ball-point pen ink. The ball-point pen ink (herein also referred to as a liquid dye) is thus produced more economicaly, it is easier to handle and the dusting problems associated with dry dye salts are avoided.

Ball-point pen ink solvents are well known. In the process of this invention benzyl alcohol and 2-phenoxyethanol represent preferred solvents. The solvent-soluble dye salt can transfer into the solvent phase either after or as it is formed. The two-phase liquid medium can be present initially or it can be formed during or subsequent to the reaction of the cationic and anionic dyes. For example, the water can be added to a mixture of the cationic and anionic dyes and the water -immiscible solvent. After cooling the two-phase liquid medium, if necessary, after forming the cationic-anionic dye salt, the solvent phase containing the dye salt is separated from the aqueous phase, washed salt-free with water and dried at 100°–115° C. The resultant concentrated dye salt solution, if necessary, is diluted to standard strength with additional water-immiscible solvent or with a well-known cosolvent and then packed off. Suitable cosolvents include ethylene glycol, propylene glycol, diethylene glycol, dipropylene glycol or the $C_{1-4}$ monoalkyl ethers of diethylene glycol (known in the trade as "Carbitols"). Dipropylene glycol is a particularly preferred cosolvent. Elimination of grit or solvent insolubles can be performed by clarifying the aqueous solutions of the cationic and anionic dye components or by directly clarifying the liquid dye. Clarification of the liquid dye usually is carried out at 70°–100° C. because of the sometimes viscous nature of the liquid dye at room temperature. If necessary, customary resin additives can be added to increase the viscosity of the liquid dyes.

The chloride content of dye solutions prepared according to the invention process is very low. This is an important feature since the presence of sodium chloride in the cationic-anionic dye salt can cause reformation and precipitation of the chloride and sodium salts of the component dyes from the organic solvent. Such an occurrence diminishes the stability of the ball-point pen ink.

Water-soluble cationic dyes which can be used in preparing the dye solutions according to the invention process are well known in the art. They are usually selected from such dyes of the triarylmethane, azo, azine or ketonimine series. Water-soluble anionic dyes operable herein are also well known and are usually selected from such dyes of the azo, triarylmethane, quinoline, azine, xanthene, anthraquinone or copper phthalocyanine series. Examples of such cationic and anionic dyes can be found in the Colour Index, Third Edition, Vol. I, 1971, pages 1001–1562 and 1607–1688. A single cationic dye and a single anionic dye can be employed in the invention process or a mixture of cationic dyes and/or a mixture of anionic dyes can be employed. Preferred cationic-anionic dye salts are the reaction products of one or more cationic triarylmethane dyes, such as Crystal Violet (C.I. Basic Violet 3, C.I. 42555), Victoria Blue B (C.I. Basic Blue 26, C.I. 44045) and Victoria Pure Blue BO (C.I. Basic Blue 7, C.I. 42595) with (a) a sulfonated azo dye, such as Metanil Yellow (C.I. Acid Yellow 36, C.I. 13065) or (b) a sulfonated, for example, a di- , tri- or tetrasulfonated, copper phthalocyanine. The combination of Crystal Violet and Metanil Yellow is particularly preferred herein. Also operable in the invention process as the cationic dye are the well known diaryl guanidines, although such compounds are not generally considered in the art as dyes.

The liquid dyes prepared according to the invention process are characterized by their high color concentration, good lightfastness and good stability with respect to polymerization or caking in storage. The following examples serve to illustrate the invention. All parts are by weight unless otherwise noted.

EXAMPLE 1

The reaction of this example was carried out at ambient temperature of 20°–25° C. A solution (12.4 parts) containing 6.22 parts of Crystal Violet was added to a mixture of 40 ml. of 2-phenosyethanol and 300 ml. of water. A solution (16.4parts) containing 4.56 parts of Metanil Yellow was added in small increments with vigorous agitation between additions. Two liquid phases separated, with the color strength in the water phase decreasing and the color strength in the solvent phase increasing as the Metanil Yellow addition progressed. Complete formation of the water-insoluble salt of the two dyes was shown by spot tests of the water phase on wet filter paper. An excess of either dye ingredient became clearly visible by its characteristic color bleed into the wet portion of the paper. While little color bleed was observed, the mixture was considered balanced, i.e. equal amounts of the two dyes had reacted to form the desired dye salt. The two-phase mixture was allowed to stand at ambient temperature for 1 hour and the lower solvent phase containing the cationic-anionic dye salt was recovered to yield 31.4 parts of liquid dye solution (19% active ingredient). The viscosity of the resultant dye solution was increased to 10,000 to 15,000 centipoises (25° C.) by the addition of 15% of a thermoplastic phenol formaldehyde resin and heating at 70°–80° C. for 2 hours.

EXAMPLE 2

(a) To 600 parts of 2-phenoxyethanol heated at 80° C. were added 255 parts of Crystal Violet, 175 parts of Victoria Blue B and 350 parts of Metanil Yellow. The mixture was stirred at 85° C. for 1 hour and balanced by adding 7 parts of Metanil Yellow. Water (300 ml.) was added and the solution was stirred at 60° C. for 15 minutes. The mixture was cooled to 10° C. by adding ice and the upper aquous eous phase was removed by decantation. Hot water (300 ml.) was added to the solvent phase. The mixture was stirred, cooled to 10° C. by the addition of ice and the upper aqueous phase was removed by decantation. The washing procedure was repeated a second time. The mixture was then dried by heating at 115° C. for 30 minutes under a stream of nitrogen, then diluted with 150 parts of 2-phenoxyethanol and 700 parts of dipropylene glycol. The solution was heated to 115° C. and then filtered through a bed of Super Cel in a steam-jacketed filter funnel. There were obtained 2,049 parts of liquid dye solution (30% active ingredient) which contained 0.22% water and 0.20% chloride. The liquid dye was loaded into a ball-point pen ink cartridge and stored for 8 weeks at 60° C. The pen wrote evenly with no loss of visual strength after 8 weeks of storage.

(b) Crystal Violet (225 parts) and Victoria Blue B (175 parts) were added to a mixture of 1,025 parts of dipropylene glycol and 525 parts of diethylene glycol monomethyl ether. Metanil Yellow (350 parts) was added and the mixture was heated at 85° C. for 1 hour. The mixture was balanced by adding an additional 12.3 parts of Metanil Yellow and heating at 85° C. for 1 hour. The reaction mixture was then heated at 110°–115° C. for 2 hours under a stream of nitrogen, after which it was filtered through a bed of Super Cel in a steam-jacketed funnel. There were obtained 2,123 parts of a dye solution (30% active ingredient) which contained 0.84% water and 0.5% chloride. The dye solution was loaded into a ball-point pen ink cartridge and stored at 60° C. for 8 weeks. The dye precipitated after only a few weeks storage. The pen wrote unevenly with a noticeable loss in visual strength. This experiment demonstrates the necessity of carrying out the process in the two-phase system at a temperature of 20°–80° C.

EXAMPLE 3

Three dye solutions were prepared as follows:
(a) Crystal Violet (17 parts) was dissolved in 200 ml. of water at 80° C. and the hot solution was filtered.
(b) Metanil Yellow (21 parts) was dissolved in 200 ml. of water at 80° C. and the hot solution was filtered.
(c) Victoria Blue B (5 parts) was dissolved in 30 parts of benzyl alcohol at 65° C. and the hot solution was filtered.

Solutions (a) and (b) were simultaneously added to solution (c) stirring and heating at 50°–60° C. After cooling to room temperature, the upper aqueous phase was removed by decantation. The solvent phase was washed with two 25 ml. portions of water. Benzyl alcohol (5 parts) was added to the solvent phase and the mixture was heated at 115° C. under nitrogen for 40 minutes. An additional 29 parts of benzyl alcohol and 37 parts of dipropylene glycol were added. There were obtained 112 parts of black liquid dye solution.

EXAMPLE 4

A solution of 294 parts of Crystal Violet in 3,356 ml. of water was added to a solution of 320 parts of Metanil Yellow in 2,330 ml. of water while stirring and heating at 50°–60° C. An additional 294 parts of Crystal Violet in 3,356 ml. of water were added. The mixture was balanced by adding a solution of 340 parts of Metanil Yellow in 2,350 ml. of water. The water was removed by decantation and 500 parts of benzyl alcohol were added. Another 294 parts of Crystal Violet in 3,356 ml. of water were added and the mixture was again balanced with a solution of 340 parts of Metanil Yellow in 2,350 ml. of water. The water phase was removed by decantation and a solution of 294 parts of Crystal Violet in 3,356 ml. of water was added. The mixture was finally balanced with a solution of 170 parts of Metanil Yellow in 1,175 ml. of water. The water phase was removed by decantation and the remaining solvent phase was washed successively with three 1,500 ml. portions of hot water and finally with 1,500 ml. of cold water. Benzyl alcohol (750 parts) was added and the mixture was heated under a nitrogen atmosphere for 1 hour at 115° C. Dipropylene glycol (2,160 parts) and 580 parts of benzyl alcohol were added to yield 5,670 parts of a black liquid dye solution (30% active ingredient) containing 0.10% water and 0.03% chloride.

EXAMPLE 5

The reaction of this example was carried out at ambient temperature of 20°–25° C. A disulfonated copper phthalocyanine, sodium salt, (15 parts) was added to 250 ml. of water. Ten percent aqueous sodium hydroxide was added, to dissolve the dye and make the mixture just alkaline to Brilliant Yellow paper, and then 40 ml. of 2-phenoxyethanol were added. A dye solution (35 ml.) containing 19.5 parts of Crystal Violet was added in small increments with vigorous agitation between additions. The mixture was allowed to stand at ambient temperature and the lower solvent phase was recovered to yield 20 parts of blue liquid dye solution.

EXAMPLE 6

The reaction of this example was carried out at ambient temperature of 20°–25° C. A mixture of 15 g. of a disulfonated copper phthalocyanine, sodium salt, and 250 ml. of water was made just alkaline to Brilliant Yellow paper by the addition of 10% aqueous sodium hydroxide. 2-Phenoxyethanol (40 ml.) was then added. A dye solution (55 ml.) containing 24 parts of Victoria Pure Blue BO (C.I. Basic Blue 7, C.I. 42595) was added incrementally with intermittent agitation. After the addition was completed, only a slight blue color remained in the aqueous phase. The lower solvent phase was recovered to yield 62 parts of reddish-blue liquid dye solution (45% active ingredient). The viscosity of the dye solution was increased by the addition of 5% of a thermoplastic phenol formaldehyde resin.

I claim:
1. Improved process for preparing a stable liquid dye solution which is of low inorganic salt content and which is directly useful as a ball-point pen ink, said process comprising admixing and reacting at 20°–80° C. approximately stoichiometric amounts of a water-soluble cationic dye and a water-soluble anionic dye in a liquid medium, which comprises a solvent for said water-soluble ionic dyes, to form a cationic-anionic dye salt which is substantially insoluble in water; without isolating the dye salt, dissolving said salt in the lower phase of a two-phase liquid medium comprising an upper aqueous phase and a lower ball-point pen ink solvent phase, said ball-point pen ink solvent being substantially insoluble in water, the two-phase liquid medium either being present during said admixing and reacting or being added subsequent to said admixing and reacting; and thereafter separating the aqueous and solvent phases which provides a stable liquid dye solution which is useful as a ball-point pen ink.

2. The process of claim 1 wherein the cationic dye is selected from Crystal Violet, Victoria Blue B and Victoria Pure Blue BO, the anionic dye is Metanil Yellow and the ball-point pen ink solvent is selected from benzyl alcohol and 2-phenoxyethanol.

3. The process of claim 2 wherein the cationic and anionic dyes are admixed and reacted at 50°–80° C.

4. The process of claim 2 wherein the cationic dye is Crystal Violet and the solvent is 2-phenoxyethanol.

5. The process of claim 3 wherein the cationic dye is a mixture of Crystal Violet and Victoria Blue B, the solvent is 2-phenoxyethanol and the recovered solvent phase is diluted with dipropylene glycol.

6. The process of claim 3 wherein the cationic dye is a mixture of Crystal Violet and Victoria Blue B, the solvent is benzyl alcohol and the recovered solvent phase is diluted with dipropylene glycol.

7. The process of claim 3 wherein the cationic dye is Crystal Violet, the solvent is benzyl alcohol and the recovered solvent phase is diluted with dipropylene glycol.

8. The process of claim 1 wherein the cationic dye is Crystal Violet, the anionic dye is a sulfonated copper phthalocyanine and the solvent is 2-phenoxyethanol.

9. The process of claim 1 wherein the cationic dye is Victoria Pure Blue BO, the anionic dye is a sulfonated copper phthalocyanine and the solvent is 2-phenosyethanol.

* * * * *

UNITED STATES PATENT OFFICE
CERTIFICATE OF CORRECTION

PATENT NO. : 4,130,435
DATED : Dec 19, 1978
INVENTOR(S) : Ira L. Hall

It is certified that error appears in the above-identified patent and that said Letters Patent are hereby corrected as shown below:

Column 5, line 16, after "solvent phases" insert

-- and recovering the solvent phase -- .

Signed and Sealed this

Eleventh Day of September 1979

[SEAL]

Attest:

LUTRELLE F. PARKER
Attesting Officer    Acting Commissioner of Patents and Trademarks